US 8,035,851 B2

(12) United States Patent
Kano et al.

(10) Patent No.: US 8,035,851 B2
(45) Date of Patent: Oct. 11, 2011

(54) IMAGE FORMATION INSTRUCTION APPARATUS, IMAGE FORMATION INSTRUCTION PROGRAM, IMAGE FORMATION INSTRUCTION METHOD, IMAGE FORMATION SERVER, IMAGE FORMATION SERVER PROGRAM, PROCESSING METHOD FOR IMAGE FORMATION SERVER, IMAGE FORMATION CONTROL APPARATUS, PROGRAM FOR IMAGE FORMATION CONTROL APPARATUS, AND IMAGE-FORMING METHOD

(75) Inventors: Yusuke Kano, Tokyo (JP); Nobuyuki Yamazoe, Tokyo (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 12/687,195

(22) Filed: Jan. 14, 2010

(65) Prior Publication Data
US 2010/0110453 A1 May 6, 2010

Related U.S. Application Data

(62) Division of application No. 11/519,159, filed on Sep. 11, 2006, now Pat. No. 7,733,514.

(30) Foreign Application Priority Data

Mar. 2, 2006 (JP) ................................ 2006-055728

(51) Int. Cl.
G06F 15/00 (2006.01)
G06F 15/16 (2006.01)
(52) U.S. Cl. ........................................ 358/1.6; 709/203
(58) Field of Classification Search ................. 358/1.15, 358/1.13, 1.14, 1.1, 1.9, 1.6, 402, 403, 1.16, 358/1.18; 709/223, 203, 206, 224, 202, 220, 709/238; 235/380, 382, 375; 379/100.01, 379/100.08; 400/76, 61, 62
See application file for complete search history.

(56) References Cited

U.S. PATENT DOCUMENTS

| 6,995,857 | B2 | 2/2006 | Lee |
| 2003/0210420 | A1 | 11/2003 | Yamauchi |
| 2005/0027615 | A1 | 2/2005 | Fujishige et al. |
| 2005/0152544 | A1 | 7/2005 | Kizawa |
| 2010/0002260 | A1* | 1/2010 | Naylor et al. ................. 358/1.15 |

FOREIGN PATENT DOCUMENTS

| JP | 2001-219627 | 8/2001 |
| JP | 2003300355 | 10/2003 |
| JP | 2005079629 | 3/2005 |
| JP | 2005235035 | 9/2005 |
| JP | 2005242732 | 9/2005 |
| JP | 2005343177 | 12/2005 |

OTHER PUBLICATIONS

Office Action issued on Jan. 24, 2008, from the Australian Patent Office for corresponding Australian Patent Application No. 2006215234.

* cited by examiner

Primary Examiner — Saeid Ebrahimi Dehkordy
(74) Attorney, Agent, or Firm — Gesmer Updegrove, LLP

(57) ABSTRACT

User identification information which is acquired from an originating portable terminal and identifies the originating portable terminal and a destination portable terminal after a wireless communication session is carried out between these portable terminals is registered in a print job database in correlation with print image data to be subjected to image formation. Further, print image data correlated to user identification information corresponding to user confirmation information which is acquired from the destination portable terminal and identifies the originating and destination portable terminals of the wireless communication session carried out between these portable terminals is extracted while referring to the print job database.

9 Claims, 5 Drawing Sheets

PRINT JOB DATABASE

| PRINT IMAGE DATA | USER IDENTIFIER INFORMATION ||
|---|---|---|
| FILE A | 0XX-1111-1111 | 0XX-2222-2222 |
| ⋮ | ⋮ | ⋮ |

Fig. 3

PRINT JOB DATABASE

| PRINT IMAGE DATA | USER IDENTIFIER INFORMATION | |
|---|---|---|
| FILE A | FFFF 1234 | 0XX-2222-2222 |
| ⋮ | ⋮ | ⋮ |

Fig. 5

DEVICE IDENTIFIER DATABASE

| DEVICE IDENTIFIER | TERMINAL IDENTIFIER |
|---|---|
| FFFF 1234 | 0XX-1111-1111 |
| FFFF 5678 | 0XX-2222-2222 |
| ⋮ | ⋮ |

Fig. 6

IMAGE FORMATION INSTRUCTION APPARATUS, IMAGE FORMATION INSTRUCTION PROGRAM, IMAGE FORMATION INSTRUCTION METHOD, IMAGE FORMATION SERVER, IMAGE FORMATION SERVER PROGRAM, PROCESSING METHOD FOR IMAGE FORMATION SERVER, IMAGE FORMATION CONTROL APPARATUS, PROGRAM FOR IMAGE FORMATION CONTROL APPARATUS, AND IMAGE-FORMING METHOD

PRIORITY INFORMATION

This application is a divisional of U.S. patent application Ser. No. 11/519,159 filed Sep. 11, 2006, which claims priority to Japanese Application No. 2006-55728, filed on Mar. 2, 2006.

BACKGROUND

1. Technical Field

The present invention relates to an image formation instruction apparatus, an image formation instruction program product, an image formation instruction method, an image formation server, a program product for the image formation server, a processing method for the image formation server, an image formation control apparatus, a program product for the image formation control apparatus, and an image formation method.

2. Related Art

When an apparatus such as a printer or a multi-function machine carries out a print operation, the apparatus often employs a technique of identifying the user in order to permit execution of printing or removal of the printed sheets from the tray only when the user corresponds to the individual who instructed the print operation or to a user designated when the print operation was instructed. Such a system is referred to as security box print, security print, on-demand print, and the like.

SUMMARY

According to an aspect of the present invention, there is provided an image formation instruction apparatus, including: a user identification information acquiring unit that acquires, from an originating portable terminal, user identification information which identifies the originating portable terminal and a destination portable terminal after a wireless communication session is carried out between these portable terminals; and a print job output unit that correlates and outputs print image data to be subjected to image formation and the user identification information.

BRIEF DESCRIPTION OF THE DRAWINGS

Exemplary embodiments of the present invention will be described in detail based on the following figures, wherein:

FIG. 3 is a diagram showing an example print job database;

FIG. 5 is a diagram showing an example print job database; and

FIG. 6 is a diagram showing an example device identifier database.

DETAILED DESCRIPTION

Configuration of Image Formation System

Figure 1:
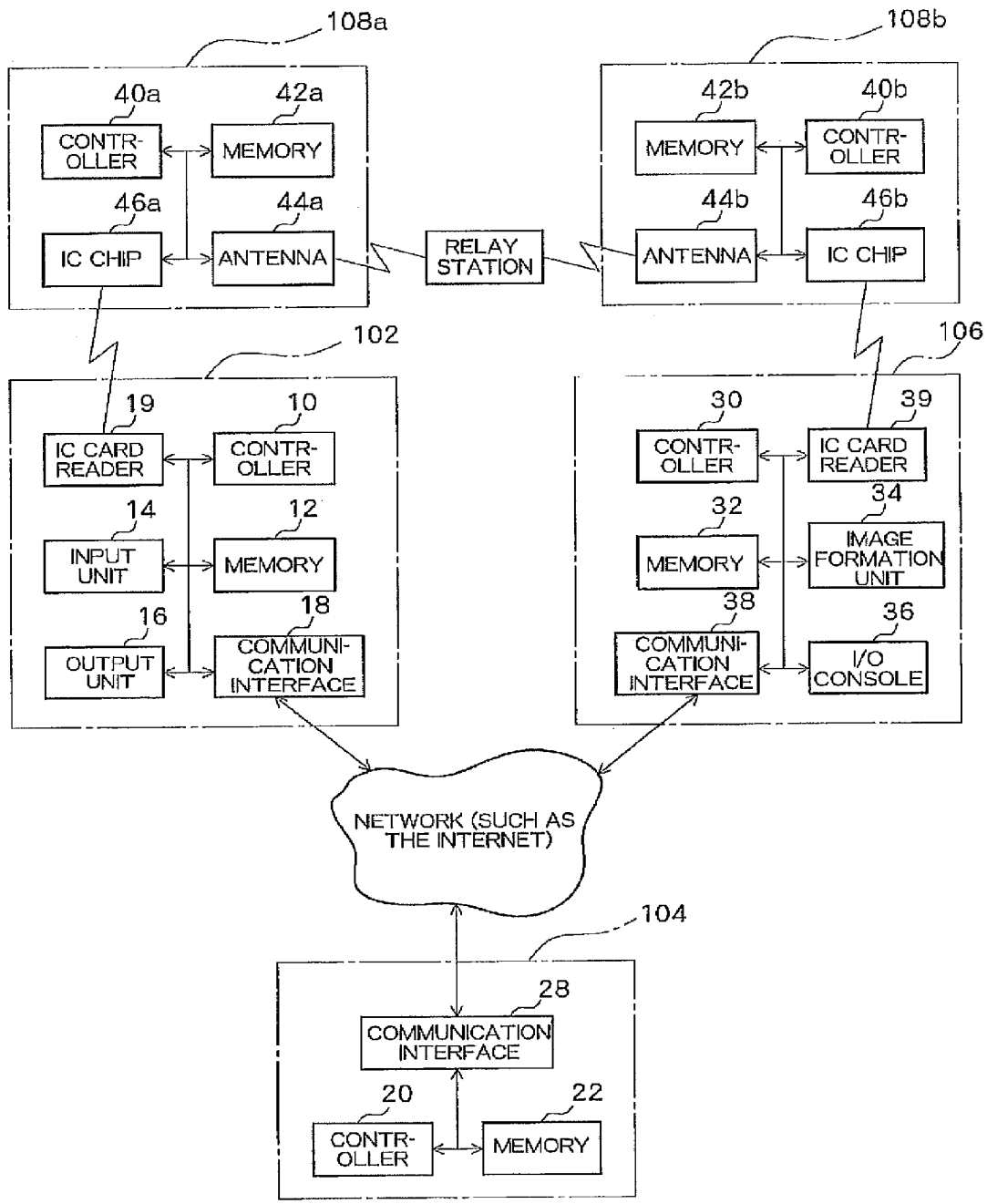
FIG. 1 is a block diagram showing the configuration of an image formation system according to an exemplary embodiment of the present invention.

As shown in FIG. 1, an image formation system 100 according to an exemplary embodiment of the present invention is configured to include a client computer 102, a print server 104, an image formation apparatus 106, and portable terminals 108a, 108b. The client computer 102, the print server 104, and the image formation apparatus 106 are connected via network lines such that information can be transmitted among these devices. The portable terminals 108a, 108b can communicate information with one another via wireless communication channels.

The client computer 102 has the configuration of a typical computer, and is constituted to include a controller 10, memory 12, an input unit 14, an output unit 16, a communication interface 18, and an IC card reader 19. The client computer 102 in this exemplary embodiment corresponds to an image formation instruction apparatus.

The controller 10 corresponds to a CPU of a computer, and performs control of various components of the client computer 102 by executing an image formation instruction program stored in the memory 12. The memory 12 stores and retains the image formation instruction program and data to be processed in the client computer 102. The memory 12 may be configured with a semiconductor memory, a hard disk, or the like. The input unit 14 receives input of instructions and parameters from users, and sends the received information to the controller 10. A keyboard and a point device may be employed as the input unit 14. The output unit 16 presents information such as an interface screen to users. The output unit 16 may be implemented with a display unit. The communication interface 18 is an interface used for transmitting information to the print server 104 and the image formation apparatus 106 via the network. The IC card reader 19 reads out information from a micro IC chip included in a portable terminal 108 and sends the obtained information to the controller 10. When information is to be read out from the IC chip, a resonant antenna integrated in the IC chip is placed near a resonant antenna of the IC card reader 19. When the antennas are placed in sufficiently close proximity such that the antennas are electromagnetically coupled to one another, information is read out from the IC chip while a non-contact electric power transmission technique is employed to supply electric power via electric waves from the IC card reader 19 side to the IC chip. By the non-contact electric power transmission technique, the IC chip can be used substantially permanently without providing a battery therein.

The print server 104 has the configuration of a typical computer, and is constituted to include a controller 20, memory 22, and a communication interface 28. The print server 104 in this exemplary embodiment corresponds to an image formation server.

The controller 20 corresponds to a CPU of a computer, and performs control of various components of the print server 104 by executing an image formation server program stored in the memory 22. The memory 22 stores and retains the image formation server program and data to be processed in the print server 104. The memory 22 may be configured with a semiconductor memory, a hard disk, or the like. The communication interface 28 is an interface used for transmitting information to the client computer 102 and the image formation apparatus 106 via the network.

The image formation apparatus 106 is constituted to include a controller 30, memory 32, an image formation unit 34, an input/output console 36, a communication interface 38, and an IC card reader 39.

The controller 30 corresponds to a CPU of a computer, and performs control of various components of the image formation apparatus 106 by executing an image formation apparatus program stored in the memory 32. The memory 32 stores and retains the image formation apparatus program and data to be processed by the image formation apparatus 106. The memory 32 may be configured with a semiconductor memory, a hard disk, or the like. The image formation unit 34 is configured as a xerographic print system including a photosensitive drum, a charging unit, a developing unit, a transfer unit, and a fuser. The image formation unit 34 operates in accordance with control by the controller 30 to produce an image by forming a latent image on the photosensitive drum based on electronic image data retained in the memory 32, developing the latent image using toner, and transferring and fusing the toner on a print medium such as paper. Although the image formation unit 34 in this exemplary embodiment is described as a xerographic print system, the image formation unit 34 may alternatively be configured to include a printer of another type such as an inkjet printer. The input/output console 36 may be a touch screen. The input/output console 36 presents to users information related to processing in the image formation apparatus 106, and receives from users input of information necessary for processing in the image formation apparatus 106. The communication interface 38 is an interface used for transmitting information to the client computer 102 and the print server 104 via the network. The IC card reader 39 reads out information from a micro IC chip included in a portable terminal 108 and sends the obtained information to the controller 30, in a manner similar to the IC card reader 19.

Each of the portable terminals 108a, 108b is configured to include a controller 40, memory 42, an antenna 44, and an IC chip 46. More specifically, the portable terminals 108 are cellular phones or PHS phones capable of performing wireless communication.

The controller 40 is a CPU that integrally controls various components of the portable terminal 108. The memory 42 stores and retains its own telephone number and information such as call history. The antenna 44 is used to perform wireless communication with a wireless communication base station or the like in order to communicate with another portable terminal 108 via a public switched telephone network or the like. The IC chip 46 is configured to include an antenna and a resonant circuit, and performs communication with the IC card readers 19, 39 included in the client computer 102 and the image formation apparatus 106, so as to transmit information stored in the memory 42 to the client computer 102 and the image formation apparatus 106.

Image Formation Processing of the First Exemplary Embodiment

Figure 2:
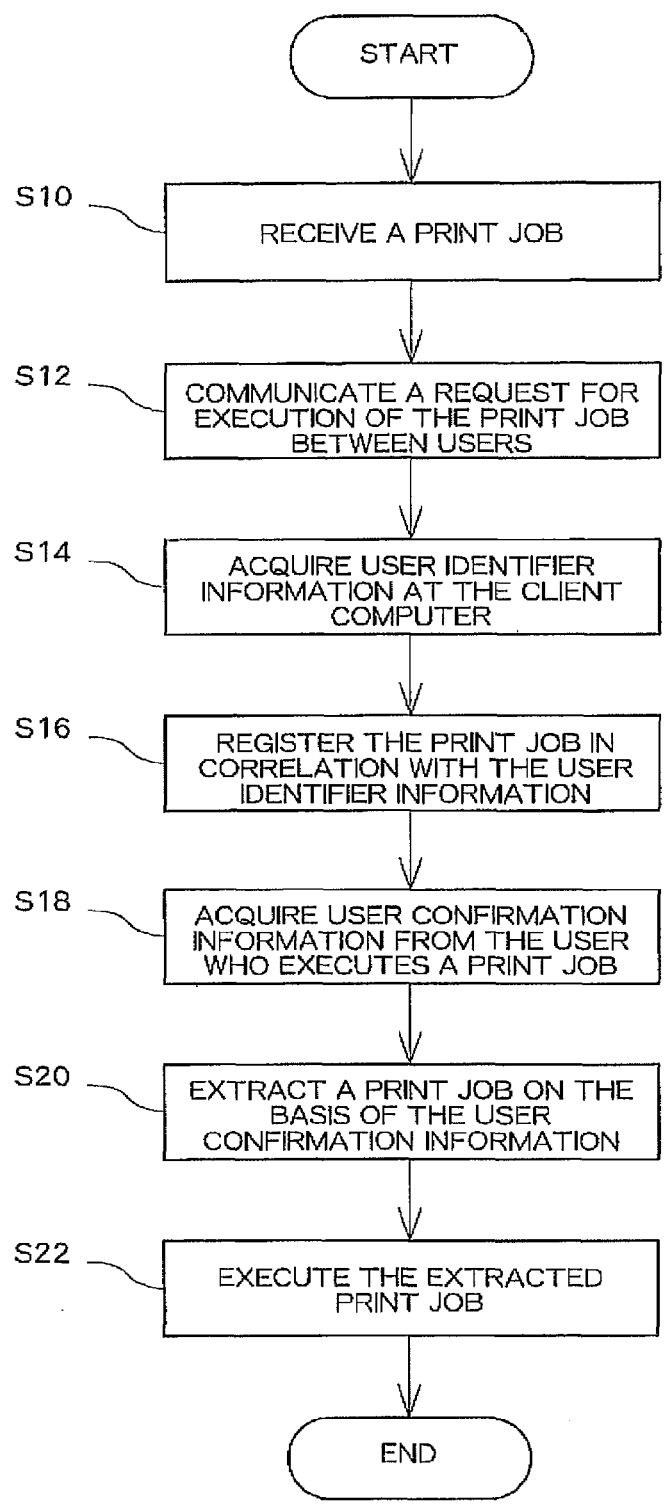
FIG. 2 is a flowchart showing image formation processing according to a first exemplary embodiment.

Image formation processing according to a first exemplary embodiment will next be described by reference to the flowchart of FIG. 2. Image formation processing according to this exemplary embodiment is a processing in which a first user A instructs a print job from a client computer 102 so as to have a second user B execute that print job at an image formation apparatus 106 located remote from the client computer 102. Steps S10-S16 relate to the processing up to registration of the print job in a database, while steps S18-S22 relate to the processing for executing the print job.

In step S10, a print job is received at the client computer 102 from user A. More specifically, user A uses the input unit 14 of the client computer 102 to designate image data stored in the memory 12 or the like as the object to be printed. The controller 10 identifies the designated image data as print image data. In the description below, it is assumed that "file A" is designated as the print image data.

In step S12, a request to execute the print job is transmitted from user A to user B. More specifically, user A uses the portable terminal 108a owned by user A to communicate the request for execution of the print job to the portable terminal 108b owned by user B. When doing so, user A specifies the portable terminal 108b as the destination of the communication session by inputting, into the portable terminal 108a which serves as the originating terminal, a terminal identifier that identifies the portable terminal 108b. This terminal identifier identifying the destination portable terminal 108b is recorded in the memory 42a of the originating portable terminal 108a. Further, a terminal identifier that identifies the originating portable terminal 108a is transmitted to the destination portable terminal 108b, and this terminal identifier of the originating portable terminal 108a is recorded in the memory 42b of the destination portable terminal 108b.

For example, when the telephone number which corresponds to the terminal identifier of the originating portable terminal 108a is "0xx-1111-1111" and the telephone number which corresponds to the terminal identifier of the destination portable terminal 108b is "0xx-2222-2222," "0xx-2222-2222" is recorded as call origination history in the memory 42a of the portable terminal 108a, while "0xx-1111-1111" is recorded as call reception history in the memory 42b of the portable terminal 108b.

In step S14, information that identifies the user who executes the print job is received at the client computer 102. On requesting execution of the print job in step S12, user A who instructed the print job places his own portable terminal 108a near the IC card reader 19 of the client computer 102, so as to cause the client computer 102 to read the terminal identifier of the portable terminal 108a and the latest call origination history record stored in the memory 42a of the portable terminal 108a. The controller 10 acquires, as user identification information, the terminal identifier identifying the portable terminal 108a and the latest call origination history record, which are read by the IC card reader 19.

According to the above-noted example, the telephone number "0xx-1111-1111" of the portable terminal 108a and the telephone number "0xx-2222-2222" corresponding to the latest call origination history record are acquired as the user identification information.

In step S16, the print job is registered in the print server 104. More specifically, the controller 10 of the client computer 102 transmits to the print server 104 the print image data designated in step S10 and the user identification information acquired in step S14. Upon receipt of the print image data and the user identification information, the controller 20 of the print server 104 correlates the received print image data and user identification information with one another, and registers the correlated image data and user identification information as a record in a print job database within the memory 22.

According to the above example, the telephone number "0xx-1111-1111" of the portable terminal 108a and the telephone number "0xx-2222-2222" of the portable terminal 108b are correlated to "file A" corresponding to the print image data, and registered in the print job database, as shown in FIG. 3.

In step S18, information that identifies the user who executes the print job is acquired at the image formation apparatus 106. After transmission of the request for execution of the print job in step S12, user B who is requested to execute the print job places his own portable terminal 108b near the IC card reader 39 of the image formation apparatus 106, so as to cause the image formation apparatus 106 to read off the terminal identifier of the portable terminal 108b and call reception history stored in the memory 92b. The controller 30 acquires, as user confirmation information, the terminal identifier of the portable terminal 108b and the call reception history, which are read by the IC card reader 39. When multiple call reception history records are stored in the memory 42b, all of the call reception history records are acquired as the user confirmation information.

According to the above example, the telephone number "0xx-2222-2222" of the portable terminal 108b and the telephone number "0xx-1111-1111" corresponding to the call reception history record are acquired as the user confirmation information.

In step S20, a print job for which printing is permitted is extracted at the print server 104. More specifically, the controller 30 of the image formation apparatus 106 transmits the user confirmation information acquired in step S18 to the print server 104. Upon receipt of the user confirmation information, the controller 20 of the print server 104 refers to the print job database registered in the memory 22 and extracts the print image data correlated to the user identification information that matches the user confirmation information. When multiple print image data are registered in correlation to the user identification information that matches the user confirmation information, all of the print image data correlated to the user identification information that matches the user confirmation information are extracted. Further, when a multiple number of call reception history records are acquired as the user confirmation information in step S18, all of print image data correlated to user identification information that match the multiple combinations of the terminal identifier of the portable terminal 108b and the respective call reception history records are extracted.

In a case in which the print job database of FIG. 3 is registered, because the user identification information in the above example is the combination of telephone numbers "0xx-1111-1111" and "0xx-2222-2222," "file A" correlated to user identification information composed of the combination of telephone numbers "0xx-1111-1111" and "0xx-2222-2222" is extracted from the print job database.

In step S22, a print job is executed at the image formation apparatus 106. More specifically, the controller 20 of the print server 104 transmits the print job extracted in step S20 to the image formation apparatus 106. Upon receipt of the print job, the controller 30 of the image formation apparatus 106 causes the image formation unit 34 to form, on a print medium, an image according to the print image data included in the print job. When multiple print jobs were extracted in step S20, the controller 30 may preferably perform control to display the extracted multiple print jobs on the screen of the input/output console 36, and to prompt the user to select a specific print job to be executed.

According to the above example, the extracted "file A" is transmitted from the print server 104 to the image formation apparatus 106, and the image formation unit 34 of the image formation apparatus 106 prints an image in accordance with to "file A" on a print medium.

According to the exemplary embodiment described above, the user who instructs a print job can impart permission to execute the print job to a particular user other than himself. By employing the information of call origination history and call reception history of portable terminals such as cellular phones, a user can easily request execution of a print job to another user while maintaining confidentiality.

Image Formation Processing of the Second Exemplary Embodiment

Figure 4:
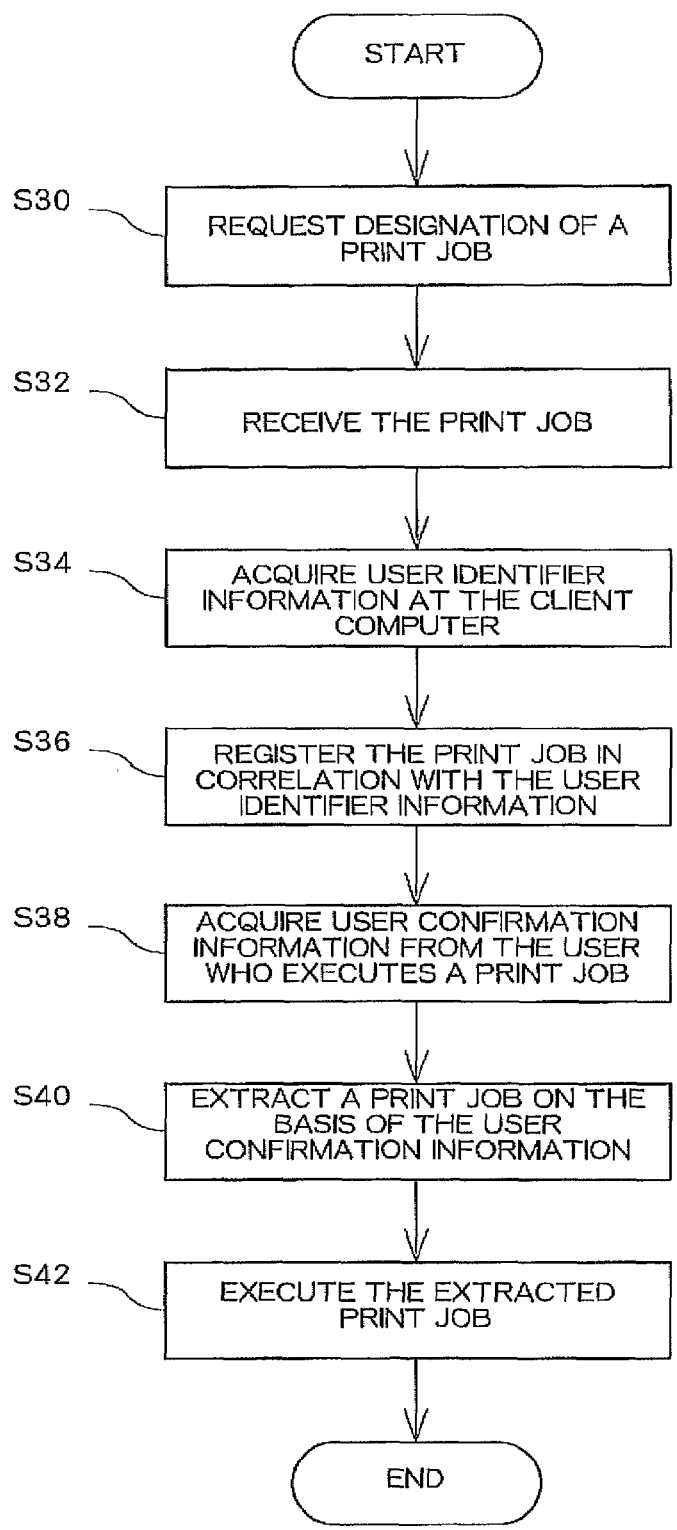
FIG. 4 is a flowchart showing an image formation processing according to a second exemplary embodiment.

Image formation processing according to a second exemplary embodiment will next be described by reference to the flowchart of FIG. 4. Image formation processing according to this exemplary embodiment is a processing in which, in contrast to the first exemplary embodiment, the second user B requests the first user A to designate a print job from the client computer 102 such that user B can execute that print job at an image formation apparatus 106 located remote from the client computer 102.

In step S30, user B transmits a request to designate a print job to user A. More specifically, user B uses the portable terminal 108b owned by user B to communicate the request for designation of a desired print job to the portable terminal 108a owned by user A. When doing so, user B specifies the portable terminal 108a as the destination of the communication session by inputting, into the portable terminal 108b which serves as the originating terminal, a terminal identifier that identifies the portable terminal 108a. This terminal identifier identifying the destination portable terminal 108a is recorded in the memory 42b of the originating portable terminal 108b. Further, a terminal identifier that identifies the originating portable terminal 108b is transmitted to the destination portable terminal 108a, and this terminal identifier of the originating portable terminal 108b is recorded in the memory 42a of the destination portable terminal 108a.

For example, when the telephone number which corresponds to the terminal identifier of the originating portable terminal 108b is "0xx-2222-2222" and the telephone number which corresponds to the terminal identifier of the destination portable terminal 108a is "0xx-1111-1111," "0xx-2222-2222" is recorded as call reception history in the memory 42a of the portable terminal 108a, while "0xx-1111-1111" is recorded as call origination history in the memory 42b of the portable terminal 108b.

In step S32, a print job is received at the client computer 102 from user A. More specifically, user A who received the request for designation of a print job uses the input unit 14 of the client computer 102 to designate, as the object to be printed, image data corresponding to the desired print job communicated from user B. The controller 10 identifies the designated image data as print image data. In the description below, it is assumed that "file A" is designated as the print image data.

In step S34, user identification information is received at the client computer 102. User A who instructed the print job places his own portable terminal 108a near the IC card reader 19 of the client computer 102, so as to cause the client computer 102 to read off the terminal identifier of the portable terminal 108a and the latest call reception history record stored in the memory 42a. The controller 10 acquires, as user identification information, the terminal identifier identifying the portable terminal 108a and the latest call reception history record, which are read by the IC card reader 19.

According to the above-noted example, the telephone number "0xx-1111-1111" of the portable terminal 108a and the telephone number "0xx-2222-2222" corresponding to the latest call reception history record are acquired as the user identification information.

In step S36, the print job is registered in the print server 104. More specifically, the controller 10 of the client computer 102 transmits to the print server 104 the print image data designated in step S32 and the user identification information acquired in step S34. Upon receipt of the print image data and the user identification information, the controller 20 of the print server 104 correlates the received print image data and user identification information with one another, and registers the correlated image data and user identification information as a record in a print job database within the memory 22.

According to the above example, similar to the case of the first exemplary embodiment, the telephone number "0xx-1111-1111" of the portable terminal 108a and the telephone number "0xx-2222-2222" of the portable terminal 108b are correlated to "file A" corresponding to the print image data, and registered in the print job database, as shown in FIG. 3.

In step S38, user confirmation information that identifies the user who executes the print job is acquired at the image formation apparatus 106. User B who requested designation of the print job in step S30 places his own portable terminal 108b near the IC card reader 39 of the image formation apparatus 106, so as to cause the image formation apparatus 106 to read off the terminal identifier of the portable terminal 108b and call origination history stored in the memory 42b. The controller 30 acquires, as user confirmation information, the terminal identifier of the portable terminal 108b and the call origination history, which are read by the IC card reader 39. When multiple call origination history records are stored in the memory 42b, all of the call origination history records are acquired as the user confirmation information.

According to the above example, the telephone number "0xx-2222-2222" of the portable terminal 108b and the telephone number "0xx-1111-1111" corresponding to the call origination history record are acquired as the user confirmation information.

In step S40, a print job for which printing is permitted is extracted at the print server 104. More specifically, the controller 30 of the image formation apparatus 106 transmits the user confirmation information acquired in step S38 to the print server 104. Upon receipt of the user confirmation information, the controller 20 of the print server 104 refers to the print job database registered in the memory 22 and extracts the print image data correlated to the user identification information that matches the user confirmation information. When multiple print image data are registered in correlation to the user identification information that matches the user confirmation information, all of the print image data correlated to the user identification information that matches the user confirmation information are extracted. Further, when multiple call origination history records are acquired as the user confirmation information in step S38, all of print image data correlated to user identification information that match the multiple combinations of the terminal identifier of the portable terminal 108b and the respective call origination history records are extracted.

In a case in which the print job database of FIG. 3 is registered, because the user confirmation information in the above example is the combination of telephone numbers "0xx-1111-1111" and "0xx-2222-2222," "file A" correlated to user identification information composed of the combination of telephone numbers "0xx-111'-1111" and "0xx-2222-2222" is extracted from the print job database.

In step S42, a print job is executed at the image formation apparatus 106. More specifically, the controller 20 of the print server 104 transmits the print job extracted in step S40 to the image formation apparatus 106. Upon receipt of the print job, the controller 30 of the image formation apparatus 106 causes the image formation unit 39 to form, on a print medium, an image in accordance with the print image data included in the print job. When multiple print jobs were extracted in step S40, the controller 30 may preferably perform control to display the extracted multiple print jobs on the screen of the input/output console 36, and to prompt the user to select a specific print job to be executed.

According to the above example, the extracted "file A" is transmitted from the print server 104 to the image formation apparatus 106, and the image formation unit 34 of the image formation apparatus 106 prints an image in accordance with "file A" on a print medium.

According to the exemplary embodiment described above, a user who wishes to obtain a printed result can request another user to instruct a corresponding print job, and it is ensured that only the user who originated the request is permitted to execute the print job. By employing the information of call origination history and call reception history of portable terminals such as cellular phones, print job executions can be easily carried out while maintaining confidentiality.

Modified Embodiment

According to the first and second exemplary embodiments described above, printing is executed while ensuring security by calling origination and reception history including terminal identifiers (telephone numbers) that identify the counterpart communicating portable terminals 108a, 108b. However, when only the terminal identifiers (telephone numbers) which are used for establishing communication sessions are employed, there may be cases where call origination and reception history could be spoofed, possibly resulting in failure to maintain confidentiality. A modified embodiment of the present invention devised in consideration of such a situation is described below, which relates to a method for accomplishing print processing at higher security by employing device identifiers (device ID) uniquely assigned to the respective portable terminals 108a, 108b.

While a modification of the first exemplary embodiment is described below, processing of the second exemplary embodiment can also be performed in a similar manner.

In this example, the device identifier uniquely assigned to the IC chip 46a provided in the portable terminal 108a is "FFFF1234," while the device identifier uniquely assigned to the IC chip 46b provided in the portable terminal 108b is "FFFF5678." In this case, in step S14 of the first exemplary embodiment, the client computer 102 acquires, as the user identification information, the device identifier "FFFF1234" instead of the telephone number of the portable terminal 108a, as well as the telephone number "0xx-2222-2222" of the portable terminal 108b corresponding to the call origination history record. Further, in step S16, the device identifier "FFFF1234" of the portable terminal 108a and the telephone number "0xx-2222-2222" of the portable terminal 108b are correlated to "file A" corresponding to the print image data, and registered in the print job database, as shown in FIG. 5.

When the print job is to be executed, in step S18, the image formation apparatus 106 acquires, as the user confirmation information, the device identifier "FFFF5678" instead of the telephone number "0xx-2222-2222" of the portable terminal 108b owned by user B who executes the print job, as well as the telephone number "0xx-1111-1111" of the portable terminal 108a corresponding to the call reception history record. In step S20, a device identifier database as shown in FIG. 6 is referred to in order to extract the print job on the basis of the user confirmation information. The device identifier database is stored in advance in the memory 22 of the print server 104.

In the device identifier database, device identifiers uniquely assigned to the respective portable terminals are registered in correlation with the telephone numbers of the corresponding portable terminals, respectively. The controller 20 of the print server 40 extracts the telephone number "0xx-2222-2222" of the portable terminal 108b on the basis of the device identifier "FFFF5678" of the portable terminal 108b included in the user confirmation information. Furthermore, the controller 20 performs a search in the print job database while referring to the device identifier database, in order to determine whether there exists, among the print jobs registered within the print job database, any print job registered in correlation to a combination of the telephone number "0xx-1111-1111" obtained from the user confirmation information and the telephone number "0xx-2222-2222" correlated to the device identifier "FFFF5678" also obtained from the user confirmation information. During this search, the device identifiers included in the user identification information within the print job database are sequentially converted into corresponding telephone numbers by referring to the device identifier database. As a result, the device identifier "FFFF1234" of the portable terminal 108a is converted into the telephone number "0xx-1111-1111" of the portable terminal 108a, and "file A" correlated to the user identification information matching the user confirmation information is extracted.

The extracted print image data "file A" is transmitted to the image formation apparatus 106. Upon receipt of the print job, the controller 30 of the image formation apparatus 106 causes the image formation unit 34 to form, on a print medium, an image according to the print image data included in the print job.

By identify the user who designated the print job and the user who executes the print job by, instead of the telephone numbers, the device identifiers uniquely imparted to the respective portable terminals, a higher degree of confidentiality can be attained in the image formation processing.

While the above-described exemplary embodiments and the variation example relate to a configuration in which execution of a print job is permitted to a specific permitted user alone, the present invention is not limited to this type of configuration. The present invention may alternatively be practiced in an embodiment in which, for example, upon designation of a print job, a corresponding printed result is output into a lockable tray, and the permission to remove the printed result from the lockable tray is given to a specific user alone by employing the portable terminals.

Moreover, while the control processing of correlating and retaining the user identification information with the print image data in the print job database is performed in the print server according to the above-described exemplary embodiments and the modified embodiment, this control processing may alternatively be performed within the client computer.

What is claimed is:

1. An image formation server, comprising:
    a storage that correlates and stores user identification information which is acquired from an originating portable terminal and identifies the originating portable terminal and a destination portable terminal after a wireless communication session is carried out between these portable terminals, and print image data to be subjected to image formation; and
    an image data extraction unit that extracts, from the storage, print image data correlated to user identification information corresponding to user confirmation information which is acquired from the destination portable terminal and identifies the originating and destination portable terminals of the wireless communication session carried out between these portable terminals, and forms on a medium an image according to the extracted image.

2. The image formation server as defined in claim 1, further comprising:
    an image data extraction unit that extracts, from the storage, print image data correlated to user identification information corresponding to user confirmation information which is acquired from the destination portable terminal and identifies the originating and destination portable terminals of the wireless communication session carried out between these portable terminals.

3. The image formation server as defined in claim 1, wherein
    the user identification information includes a telephone number of the originating portable terminal or a telephone number of the destination portable terminal.

4. The image formation server as defined in claim 1, wherein
    the user identification information includes a device identifier uniquely assigned to the originating portable terminal, or a device identifier uniquely assigned to the destination portable terminal.

5. A non-transitory computer readable medium storing a program causing a computer to execute a process for an image formation server, the process comprising:
    correlating and storing, as a print job database, user identification information which is acquired from an originating portable terminal and identifies the originating portable terminal and a destination portable terminal after a wireless communication session is carried out between these portable terminals, and print image data to be subjected to image formation; and
    extracting, from the print job database, print image data correlated to user identification information corresponding to user confirmation information which is acquired from the destination portable terminal and identifies the originating and destination portable terminals of the wireless communication session carried out between these portable terminals, and forms on a medium an image according to the extracted image.

6. The non-transitory computer readable medium storing a program as defined in claim 5, wherein the process further comprises:
    extracting, from the print job database, print image data correlated to user identification information corresponding to user confirmation information which is acquired from the destination portable terminal and identifies the originating and destination portable terminals of the wireless communication session carried out between these portable terminals.

7. The non-transitory computer readable medium storing a program as defined in claim 5, wherein
    the user identification information includes a telephone number of the originating portable terminal or a telephone number of the destination portable terminal.

8. The non-transitory computer readable medium storing a program as defined in claim 5, wherein
    the user identification information includes a device identifier uniquely assigned to the originating portable terminal, or a device identifier uniquely assigned to the destination portable terminal.

9. A processing method for an image formation server, comprising:
    correlating and retaining, as a print job database, user identification information which is acquired from an originating portable terminal and identifies the originating portable terminal and a destination portable terminal after a wireless communication session is carried out between these portable terminals, and print image data to be subjected to image formation; and extracting, from the print job database, print image data correlated to user identification information corresponding to user confirmation information which is acquired from the destination portable terminal and identifies the originating and destination portable terminals of the wireless communication session carried out between these portable terminals, and forms on a medium an image according to the extracted image.

* * * * *